United States Patent [19]

Otani et al.

[11] Patent Number: 4,758,653

[45] Date of Patent: Jul. 19, 1988

[54] THERMOSETTING COMPOSITION, METHOD OF PRODUCING FUSIBLE THERMOSETTING RESIN USING SAME, AND PROCESS FOR THE PRODUCTION OF CONDENSED, POLYNUCLEAR AROMATIC HYDROCARBON RESIN USING SAME

[75] Inventors: Sugio Otani, Kiryu; Yoichiro Nagai, Yamato, both of Japan

[73] Assignee: Fuji Standard Research Inc., Japan

[21] Appl. No.: 829,518

[22] Filed: Feb. 14, 1986

[30] Foreign Application Priority Data

Feb. 18, 1985 [JP] Japan .................................. 60-30055
Feb. 18, 1985 [JP] Japan .................................. 60-30056

[51] Int. Cl.$^4$ ............................................. C08G 61/00
[52] U.S. Cl. ........................................ 528/396; 524/1; 524/612; 527/500
[58] Field of Search ...................... 528/396; 527/500; 524/612

[56] References Cited

U.S. PATENT DOCUMENTS 3,565,832  2/1971  Bilow et al. ........................ 528/396
3,677,976  7/1972  Miller et al. ....................... 260/2 H

FOREIGN PATENT DOCUMENTS 1494443  12/1977  United Kingdom .

Primary Examiner—Harold D. Anderson
Attorney, Agent, or Firm—Lorusso & Loud

[57] ABSTRACT

A thermosetting composition which is capable of affording a heat-resisting, condensed polynuclear aromatic hydrocarbon resin and which includes:

a raw material containing one or more condensed polynuclear aromatic compounds having at least three condensed benzene rings;

a crosslinking agent containing an aromatic compound having at least two hydroxymethyl or halomethyl groups; and an acid catalyst. The raw material may be, for example, a coal pitch or petroleum pitch.

33 Claims, 4 Drawing Sheets

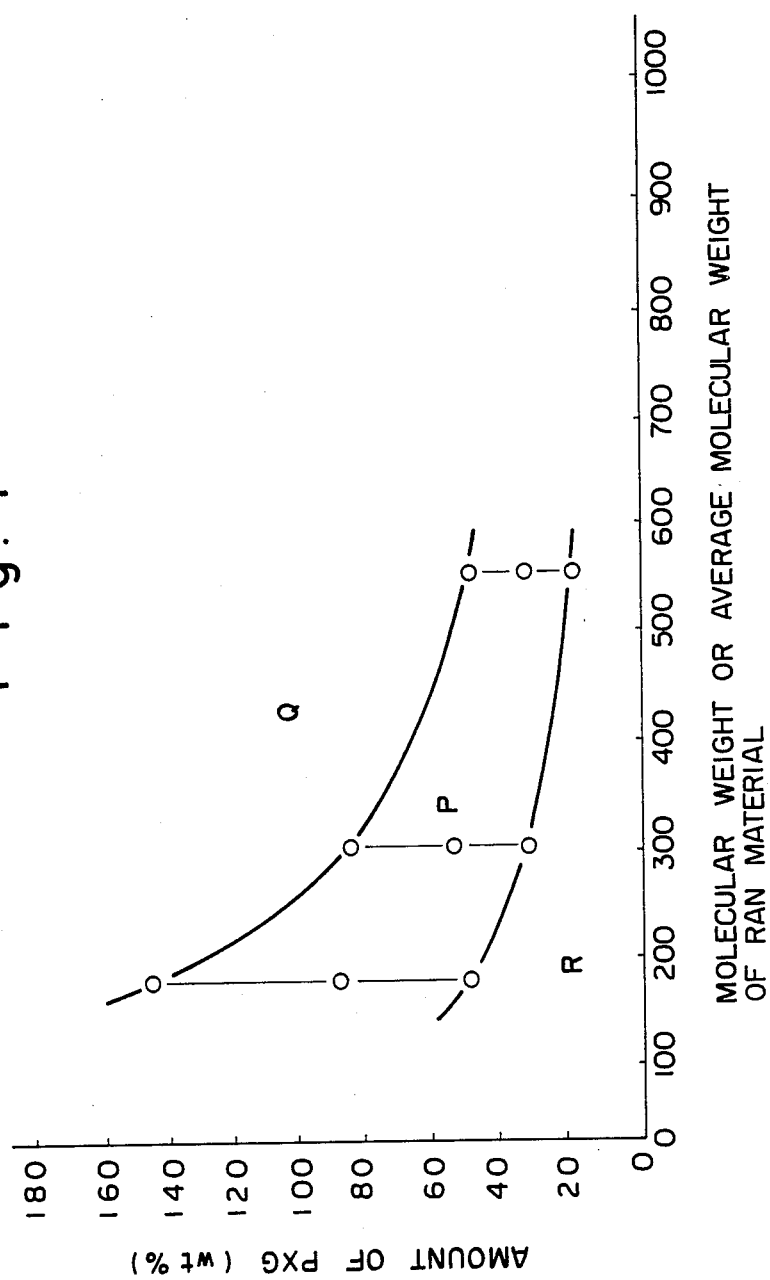

THERMOSETTING COMPOSITION, METHOD OF PRODUCING FUSIBLE THERMOSETTING RESIN USING SAME, AND PROCESS FOR THE PRODUCTION OF CONDENSED, POLYNUCLEAR AROMATIC HYDROCARBON RESIN USING SAME

This invention relates to a novel thermosetting composition and to a method of preparing a fusible thermosetting resin using the above composition. The present invention is also directed to a process for the manufacture of a heat-resisting, condensed polynuclear aromatic hydrocarbon resin using the above composition or the above fusible resin.

Aromatic hydrocarbon resins obtained using aromatic hydrocarbons as a raw material are known in the art. One typical example of such resins is xylene-formaldehyde resin obtained by reacting xylene with formaldehyde in the presence of an acid catalyst. Such a resin, however, does not exhibit a thermosetting property and fails to give, upon being heated, a heat-resisting resin. Japanese patent publication (Tokkyo Kokoku) No. 37-17499 discloses a process for the manufacture of a hardened resin, which includes reacting a polyxylyene glycol with acenaphthene or an acenaphthene-formaldehyde resin. This method is, however, not satisfactory from an industrial standpoint because the production of the polyxylylene glycol is not easy.

The present invention is aimed at the provision of an economical, industrially applicable method for the production of a hardened, aromatic hydrocarbon resin having an excellent heat resistance and a novel thermosetting composition useful for the production of the above hardened resin.

In accordance with the present invention there is provided a thermosetting composition comprising:

(i) a raw material containing one or more condensed polynuclear aromatic compounds having at least three condensed benzene rings;

(ii) a crosslinking agent containing an aromatic compound having at least two hydroxymethyl or halomethyl groups; and (iii) an acid catalyst;

wherein the amounts of said raw material and said crosslinking agent are such as to satisfy the following condition:

$$\frac{1.1}{n} \leq \frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said croslining agent and n is the number of the hydroxymethyl or halomethyl groups of said crosslinking agent.

In another aspect, the present invention provides a method of producing a thermosetting resin, comprising the steps of:

providing a mixture which includes (i) a raw material containing one or more condensed polynuclear aromatic compounds having at least three condensed benzene rings;

(ii) a crosslinking agent containing an aromatic compound having at least two hydroxymethyl or halomethyl groups; and (iii) an acid catalyst;

wherein the amounts of said raw material and said crosslinking agent are such as to satisfy the following condition:

$$\frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslining agent and n is the number of the hydroxymethyl or halomethyl groups of said crosslinking agent, and reacting said mixture at a temperature sufficient to effect the crosslinking of said one or more condensed polynuclear aromatic compounds and to obtain said thermosetting resin as a fusible product.

In a further aspect, the present invention provides a process for the production of a heat-resisting, condensed polynuclear aromatic hydrocarbon resin, comprising the steps of:

providing a mixture containing:

(i) a raw material containing one or more condensed polynuclear aromatic compounds having at least three condensed benzene rings;

(ii) a crosslinking agent containing an aromatic compound having at least two hydroxymethyl or halomethyl groups; and (iii) an acid catalyst;

wherein the amounts of said raw material and said crosslinking agent are such as to satisfy the following condition:

$$\frac{1.1}{n} \leq \frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslining agent and n is the number of the hydroxymethyl or halomethyl groups of said crosslinking agent; and reacting said mixture to form said heat-resisting, condensed polynuclear aromatic hydrocarbon resin as an infusible product.

The present invention will now be described in detail below with reference to the accompanying drawings, in which:

FIG. 7 is a graphic representation showing the relationship between the amount of p-xylylene glycol and the molecular weight or average molecular weight of the raw material, the region P between the two curves being especially suitable for the production of desired COPNA resins.

The thermosetting composition according to the present invention gives, upon being heated, a condensed, polynuclear aromatic hydrocarbon resin (hereinafter referred to simply as "COPNA resin") which is infusible and is insoluble in a solvent and which has an excellent heat resistance. The COPNA resin has a plurality of condensed polynuclear aromatic hydrocarbon nuclei crosslinked by aromatic nuclei through methylene linkages. The aromatic compound having two or more hydroxymethyl or halomethyl groups and contained in the thermosetting composition serves as a crosslinking agent. The crosslinking causes the formation of water in the case of using a hydroxymethyl groups-containing aromatic compound and or formation of a hydrogen halide in the case of using a halomethyl groups-containing aromatic compound as the crosslinking agent. The crosslinking is accelerated by an acid catalyst, indicating that the crosslinking reaction proceeds in a cation reaction mechanism.

One typical example of the thermosetting composition includes 7 moles of pyrene, 3 moles of phenanthrene, 10 moles of 1,4-di(hydroxymethyl)benzene and a suitable quantity of p-toluenesulfonic acid. The composition fuses at a temperature of about 100° C. At a temperature of about 120° C., the reaction mass begins to bubble due to the vaporization of water produced in situ as a result of the dehydration reaction. By maintaining the reaction mixture at that temperature, the bubbling ceases after about 40 min and the reaction mixture becomes viscous after 2-3 hours. After about 15 hours, there is formed a dense, completely hardened product which is yellow or yellow green in color and which is infusible and is insoluble.

Figure 1:
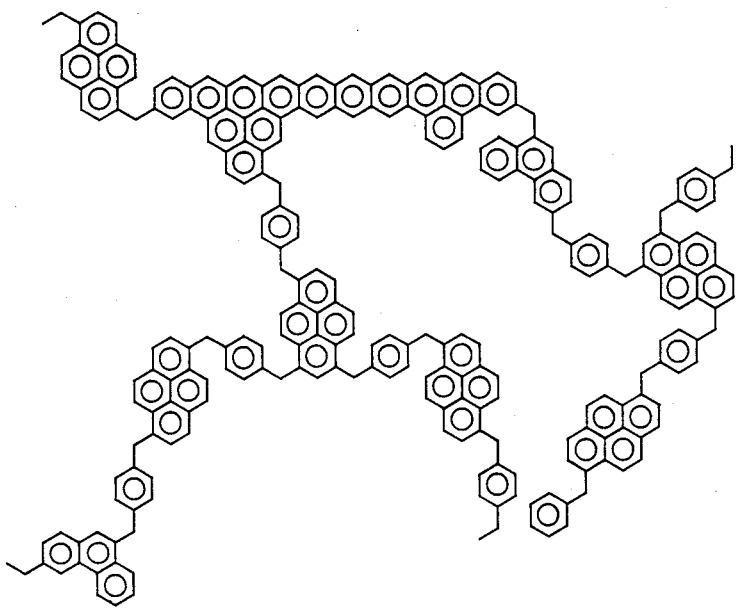
FIG. 1 is an schematic representation of the chemical structure of a condensed, polynuclear aromatic hydrocarbon resin (COPNA resin), prior to an after-hardening treatment, according to the present invention.
Figure 2:
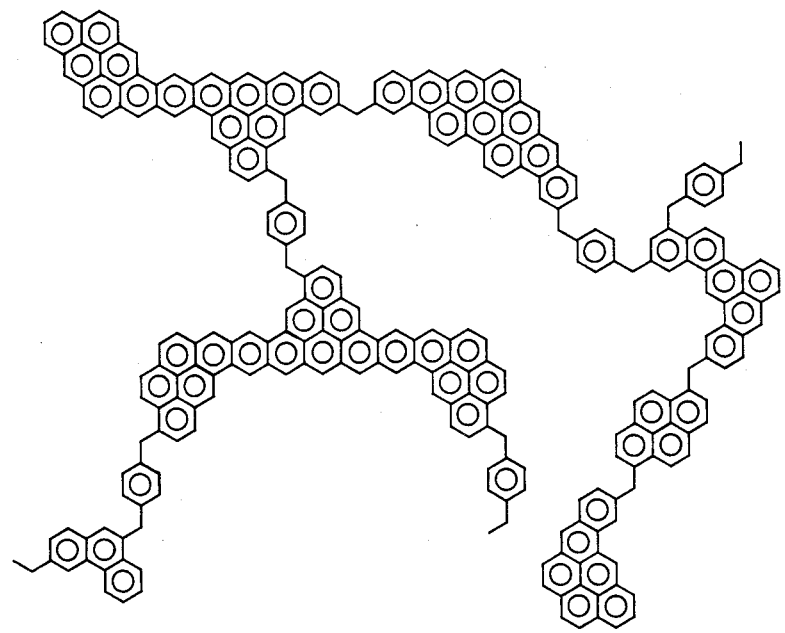
FIG. 2 is a schematic representation, similar to FIG. 1, showing the chemical structure of an after-hardened COPNA resin.

It is believed that the hardened product has a structure represented by a model structure shown in FIG. 1. As illustrated in FIG. 1, pyrene and phenanthrene molecules are crosslinked at random by xylylene groups. The model structure is in well conformity with that deduced from the results of infra-red spectrum analysis and elementary analysis. The hardened product is photosensitive, i.e. the color changes to green or brown when the product is exposed to the sun light in the air. This change of color is considered to be caused by the oxidation of the methylene linkages. When the hardened product is heated in an inert atmosphere to effect an after-hardening treatment, the color changes, at about 160° C., to green, dark green and finally black. The change of the color is considered to result from the formation of new condensed rings accompanied with dehydrogenation, as illustrated in FIG. 2. The formation of new rings is accelerated by oxygen. Therefore, when the thermosetting composition of the present invention is heated in air, the formation of condensed rings occurs acceleratedly, although the time required for the hardening remains unchanged. The hardened product subjected to the after-hardening treatment has a high hardness and an excellent heat resistance. The thermograviometric analysis of the hardened product reveals that the weight loss at an elevated temperature is very small. The hardened product is an electrical insulator and has so high an electrical resistivity that the electrical resistance is incapable of being measured by means of a conventional digital-type tester.

The COPNA resin obtained by hardening the thermosetting composition of the present invention is as outlined above. Hereinafter will now be described in detail the composition, a method of preparing an intermediate condensation product (B-stage resin) using same, and a process for the production of the COPNA resin using same.

(1) Raw Material

The thermosetting composition of the present invention comprises a raw material containing as a main component one or more condensed polynuclear aromatic hydrocarbons each having at least 3 condensed benzene nuclei. A raw material containing as a major component one or more aromatic hydrocarbons having less than 3 condensed benzene nuclei, such as naphthalene and acenaphthene, is not suited for the purpose of the present invention because it requires a long hardening time. Examples of suitable condensed polynuclear aromatic compounds include those having 3-5 condensed benzene rings such as phenanthrene, anthracene, pyrene, chrysene, naphthacene, fluoranthene, perylene, picene, alkyl derivatives thereof, benzpyrenes and benzperylenes. Other polynuclear compounds having the above aromatic hydrocarbons linked by methylene, phenylene, xylylene or the like divalent groups may also be used. These condensed polynuclear aromatic hydrocarbons may be used singly or in combination of two or more.

A raw material containing mainly a mixture of the above-described condensed polynuclear hydrocarbons may be advantageously used for the purpose of the present invention. Examples of such raw materials include petroleum pitch, coal pitch, distillation residues of vacuum gas oil and thermal cracking residues of naphtha. It is preferable to use coal or petroleum-derived heavy hydrocarbon oil having a softening point of 10°-200° C., more preferably 20°-180° C. Especially, it is preferable to use coal-derived or petroleum-derived pitch having an $f_a$ value of at least 0.6, more preferably at least 0.7, and an $H_a$ value of at least 20%, more preferably at least 30%. The $f_a$ value and $H_a$ value of heavy hydrocarbon oil or pitch are defined as follows:

$$f_a \text{ value} = \frac{\text{The number of aromatic carbon atoms of the oil or pitch}}{\text{The total number of carbon atoms of the oil or pitch}}$$

$$H_a \text{ value} = \frac{\text{The number of aromatic hydrogen atoms of the oil or pitch}}{\text{The total number of hydrogen atoms of the oil or pitch}} \times 100\%$$

The $f_a$ value is calculated in accordance with Brown-Ladner method based on the results of elementary analysis and proton NMR. The $H_a$ value is calculated from the results of proton NMR analysis.

As described hereinafter, the raw material is reacted with a crosslinking agent at an elevated temperature. The crosslinking reaction may be performed in the presence of a suitable solvent, especially at the initial stage of the crosslinking reaction. Since the solubility of the crosslinked product decreases with the increase of the molecular weight, however, the reaction is generally performed without using a solvent. In this case, it is important that the reaction mixture converts to a fused state at the reaction temperature. Thus, condensed polynuclear aromatic hydrocarbon raw materials must be selected to meet this criterion. As for the crosslinking agent, since halomethyl group-containing crosslinking agents are more reactive than hydroxymethyl group-containing ones, the former crosslinking agents are suited in the reaction using a solvent. If the raw material used requires relatively a high reaction temperature in view of the melting point thereof, then the use of a hydroxymethyl group-containing crosslinking agent is generally suitable. In the case of using hydroxymethyl group-containing crosslinking agents, the reaction generally starts to proceed at a temperature of 70°–120° C. Therefore, the use of a raw material capable of fusing at a temperature of 150° C. or less is proper. However, this does not mean to exclude the use of a raw material having a melting point of above 150° C. For example, anthracene with a melting point of 216° C. can be suitably used for the purpose of the present invention, because, in the presence of 0.5 mole of xylylene glycol per mole of anthracene, anthracene undergoes dimerization to form an anthracene dimer having a melting point of 150° C. or below, when heated gradually to about 180° C. In this case, it is preferable not to use more than 0.5 mole of xylylene glycol per mole of anthracene so as to prevent the occurrence of polymerization. In like manner, it is possible to use high melting point aromatic compounds as a raw material.

Coal tar pitch is a mixture of various compounds mainly including condensed polynuclear aromatic hydrocarbons containing 3–5 condensed benzene rings and has an average molecular weight of about 300. Though the average molecular weight is higher than that of a condensed polynuclear aromatic hydrocarbon with 3–5 condensed benzene rings, the melting point of coal tar pitch is lower than that of the condensed polynuclear aromatic hydrocarbon. Thus, coal tar pitch is advantageously used as a raw material for reaction in the fused state. Whilst the reactivity of pitch is lower than the condensed polynuclear aromatic hydrocarbon itself, perhaps because of the presence of heterocyclic aromatics containing nitrogen as a member of the aromatic rings, the use of pitch as a raw material for the production of COPNA resin is preferable for its inexpensiveness. Coal tar or coal tar pitch from which basic substances have been removed by, for example, washing with an acid, or from which other compounds than condensed polynuclear aromatic hydrocarbons, especially those having 3–5 condensed benzene rings, are removed is one of the most preferable raw materials.

Although coal tar which is liquid at normal temperature may be used as a raw material, a high reaction temperature and a long reaction time are required for effecting the crosslinking thereof, because of the low reactivity thereof in comparison with condensed polynuclear aromatic hydrocarbons such as pyrene and phenanthrene or with coal tar pitch. For example, in order to complete the crosslinking in the presence of 5% p-toluenesulfonic acid (acid catalyst), a reaction temperature of 120° C. and a reaction time of 20 hours are required when a condensed polynuclear aromatic hydrocarbon itself is used, 140° C. and 30 hours are required when coal tar pitch is used and 180° C. and 30 hours are required when coal tar is used. Thus, when coal tar is used for the production of the COPNA resin, it is preferred that volatile components contained therein be removed therefrom. Such a removal of volatile components is advisable also for the purpose of reducing the amount of sublimating substances in the COPNA resin. As described previously, it is preferred that coal-derived or petroleum-derived heavy hydrocarbons used as a raw material in the thermosetting composition of the present invention have a softening point of 10°–200° C., preferably 20°–180° C. A heavy hydrocarbon raw material with a softening point of less than 10° C. will give a hardened product containing components which are vaporized upon being heated. When the softening point of the heavy hydrocarbon raw material is higher than 200° C., it becomes difficult to obtain a fused reaction mixture with a suitable fluidity.

(2) Crosslinking Agent

An aromatic compound having at least 2, generally 2 or 3 hydroxymethyl or halomethyl groups is used as a crosslinking agent. The aromatic compound preferably has 1–4 benzene rings inclusive of condensed benzene rings. Illustrative of suitable crosslinking agents are two or more hydroxymethyl or halomethyl group-containing benzenes, naphthalenes, anthracenes, pyrenes and alkyl derivatives thereof. Coal tar fractions containing the above-described aromatic compound or compounds and polyhydroxymethylated or polyhalomethylated petroleum fractions may also be used as a crosslinking agent. Xylylene glycols, tri(hydroxymethyl)benzenes and dimethyldi(hydroxymethyl)benzenes are especially preferable crosslinking agents. Condensed polynuclear aromatic hydrocarbons having two or more hydroxymethyl or halomethyl groups, such as di(hydroxymethyl)naphthalenes and di(halomethyl)naphthalenes are generally more reactive than hydroxymethylated or halomethylated benzenes and are also preferable crosslinking agents.

(3) Molar Ratio of Crosslinking Agent to Raw Material

When the crosslinking of a raw material of a condensed polynuclear aromatic hydrocarbon is carried out using di(hydroxymethy) or di(halomethyl)aromatic compound as the crosslinking agent with the molar ratio of the crosslinking agent to the raw material being 0.5, a dimer of the raw material is predominantly produced, so that the resulting crosslinked product has a low melting point. As the amount of the crosslinking agent increases, i.e. the molar ratio increases, the crosslinking proceeds at a higher rate and the strength of the crosslinked product becomes higher. With a molar ratio of 1.75, the crosslinking rate becomes maximum. A molar ratio of above 2.0, however, tends to inhibit the reaction and gives a somewhat heterogeneous product. It has been found that the above also applies to the case where a mixture of complicated compounds such as coal tar or pitch is used as the raw material in place of the condensed polynuclear aromatic hydrocarbon. In the present invention, the amount of the crosslinking agent and the raw material in the thermosetting composition should satisfy the following condition:

$$\frac{1.1}{n} \leq \frac{W_2}{W_1} \times \frac{a}{b} \leq \frac{6}{n}$$

where $W_1$ and $W_2$ stand for the amounts of the raw material and the crosslinking agent, respectively, a and b stand for the molecular weight or average molecular weight of the raw material and the crosslinking agent, respectively, and n is the number of the hydroxymethyl or halomethyl groups of the crosslinking agent.

Thus, in order to proceed the crosslinking sufficiently and to obtain the COPNA resin, the amount of the crosslinking agent relative to the raw material must be greater than a minimum limit which is dependent on the number of the halomethyl or hydroxymethyl groups. When the relative amount of the crosslinking agent to the raw material is smaller than the lower limit, i.e. when $(W_2/W_1) \times (a/b)$ is below $1.1/n$, the crosslinking proceeds only in the initial stage and the desired hardened product is not produced. Preferably, $(W_2/W_1) \times (a/b)$ is 0.6–2.0 when n is 2.

(4) Crosslinking Temperature

When a polyhalomethylated aromatic compound is used as a crosslinking agent and a Lewis acid such as aluminum halide is used as a catalyst, the crosslinking proceeds even at room temperature. Therefore, when the crosslinking is effected with the use of a solvent, it is preferable to use such a crosslinking agent and a catalyst. In this case, the crosslinking is preferably performed at a temperature of at least 50° C., preferably at least 70° C. However, because of toxicity of some polyhalomethylated aromatic compounds and because of the production of a hydrogen halide such as hydrogen chloride during the course of the reaction, the use of polyhalomethylated aromatic compounds encounters certain difficulties in practice. Further, since it is difficult to complete the crosslinking in the presence of a solvent, the removal of solvent at a later stage of the reaction is required. In these circumstances, the reaction in the solution phase with the use of a polyhalomethylated aromatic compound as the crosslinking agent is effected in an initial stage reaction of the raw material with a high melting point which is soluble in an organic solvent such as benzene, chlorobenzene or nitrobenzene.

When the crosslinking is performed using a polyhydroxymethylated aromatic compound as a crosslinking agent and a proton acid as a catalyst without using a solvent, the reaction slowly starts at a temperature of about 70° C. and proceeds markedly at a temperature of about 120° C. The reaction is accompanied with the production of steam and increase in viscosity of the reaction mixture. A slow reaction rate is preferred to obtain a dense, pore-free product. With a fast reaction rate, the product tends to become porous. Since the reactivity varies with the kind of the raw material and crosslinking agent and also with the molar ratio of the crosslinking agent to the raw material, a suitable reaction temperature depends on the kind and amount of the reactants. Generally, however, the crosslinking is performed at a temperature of 70°–350° C., preferably 110°–250° C. In order to obtain a dense, pore-free hardened product, a temperature of 100°–150° C. is preferably used.

It is to be noted that a suitable reaction temperature should be selected with consideration for the object of the crosslinking. The thermosetting composition according to the present invention may be used for the purpose of either directly preparing a completely hardened COPNA resin or preparing an intermediate condensation product (B-stage resin) which is still fusible and which is used as starting material for the production of a COPNA resin. In the latter case, the intermediate condensation product may be, for example, molded with or without using an aggregate or substrate into a desired shape, followed by heat-treatment (hardening treatment) thereby to obtain an infusible COPNA resin shaped product. The B-stage resin may be prepared either by terminating the crosslinking reaction before completion of the reaction or by using a crosslinking agent in an amount insufficient to produce an infusible hardened product, i.e. in an amount providing a molar ratio of the crosslinking agent to the raw material which is lower than the previously-described minimum limit, generally lower than $1.0/n$. In either preparation method, since the intermediate condensation product is still fusible, vigorous generation of bubbles formed as a result of using a high reaction temperature does not cause any problem. Therefore, the temperature range suitable for the production of the intermediate condensation product is broader and the upper limit becomes higher as compared with the temperature range for the direct, one stage production of the COPNA resin.

(5) Catalyst

Both Lewis acid catalysts and proton acid catalysts may be used to effect the crosslinking. Suitable catalysts are to be selected depending on the kind of the raw material and the crosslinking agent and on the reaction phase adopted. When the crosslinking is performed using a polyhalomethylated aromatic compound as a crosslinking agent together with a solvent, a Lewis acid is suitably used as catalyst. When a hydroxymethylated aromatic compound is used, the use of a proton acid is recommended.

The amount of the proton acid catalyst used in a solvent-free reaction phase varies with the kind of the raw material and reaction temperature adopted. Generally, however, the proton acid is used in an amount of at least 0.2% by weight, preferably 1–10% by weight in case where condensed polynuclear aromatic hydrocarbons are used by themselves and 1–7% by weight in the case of pitch coal tar of the like. The use of too large an amount of the catalyst is disadvantageous because the reaction proceeds at too high a rate to control. Illustrative of suitable proton acid catalysts are sulfuric acid and organic sulfonic acids. Illustrative of suitable Lewis acid catalysts are aluminum chloride and boron trifluoride.

(6) Intermediate Condensation Product (B-Stage Resin)

Irrespective of whether the thermosetting composition of the present invention is used as a binder in conjunction with an aggregate or is used by itself for the production of shaped articles, it is preferable to use an intermediate condensation product obtained by incompletely crosslinking the thermosetting composition, in place of the non-treated thermosetting composition. The precursor resin (intermediate condensation product) which is still fusible and soluble and which has not yet been completely hardened is generally referred to as a B-stage resin.

The B-stage resin may be prepared in the following manner: The first method includes providing a thermosetting composition containing a raw material, a crosslinking agent and a catalyst in amount sufficient to provide a hardened resin by heating, and heating the thermosetting composition at a temperature and for a period of time insufficient to produce a hardened resin, thereby obtaining an incompletely hardened, fusible resin. The B-stage resin thus obtained may be converted into an infusible, completely hardened resin merely by heating.

The second method includes providing a composition containing a raw material, a crosslinking agent and a catalyst with a molar ratio of the crosslinking agent to the raw material being lower than the previously-described minimum limit, preferably not greater than 1.0/n (where n has the same meaning as above), and heating the composition at a temperature and for a period of time sufficient to complete the crosslinking, thereby obtaining an incompletely hardened, fusible resin. The B-stage resin thus obtained may be completely hardened by heating after the addition of a supplemental amount of the crosslinking agent sufficient to completely harden the B-stage resin. The advantage of the second method resides in availability of wide option in determining the reaction temperature and time.

The third method for the preparation of B-stage resin includes providing a composition containing a raw material, a crosslinking agent and a catalyst with an amount of the catalyst being insufficient to completely effect the crosslinking as such, and heating the composition at a temperature and for a period of time so that an incompletely hardened, fusible resin is obtained. A relatively high reaction temperature is employed in the third method. The B-stage resin thus obtained may be converted into a completely hardened, infusible resin by heating in the presence of an additional amount of the catalyst.

The amounts of the raw material, crosslinking agent and catalyst required for the preparation of a completely hardened COPNA resin through a B-stage resin is the same as those required in the direct, one-stage production thereof, i.e. the same as described previously. The reaction temperature for the production of the B-stage resin is generally 70°–300° C., preferably 90°–250° C. in any of the above first to third methods.

The B-stage resin is insoluble in methanol and n-hexane, hardly soluble in benzene and soluble in pyridine, quinoline and tetrahydrofuran. The B-stage resin obtained at an early stage of the reaction is in the form of a paste at room temperature. As the reaction proceeds further, the softening point of the B-stage resin becomes high. When the B-stage resin is used as a binder or an adhesive for the fabrication of various composite materials, it is preferred that the reaction be continued so that the resulting B-stage resin becomes fluid at a temperature of 70°–120° C. When used by itself for the production of shaped products, the reaction is suitably allowed to proceed so that the resulting B-stage resin has a viscosity suitable for pouring into a mold cavity at a temperature of 80°–150° C. If the molding or shaping is carried out using powder of the B-stage resin, the reaction is desirably performed so as to obtain the B-stage resin with a high melting point. Since the B-stage resin is generally soluble in some organic solvents, the B-stage resin may be formed into a film by applying a coating of the resin dissolved in a suitable solvent onto a suitable substrate, followed by drying. To obtain shaped articles using the B-stage resin, the cojoint use of an aggregate is advantageous.

(7) After Hardening

When heated at a temperature of 70°–350° C. in air or in an inert gas atmosphere, the thermosetting composition of the present invention is converted first into an infusible, hardened resin which is not at all soluble in methanol and n-hexane, which contains a small quantity of components soluble in tetrahydrofuran, pyridine and quinoline and which is swelled in benzene, and then into a completely hardened product which is neither fusible nor soluble in an organic solvent. The heat treatment for the conversion of the thermosetting composition into infusible and insoluble product may be preferably conducted in accordance with one of the following methods:

(i) heating the composition at a fixed, constant temperature in the range of 70°–350° C., preferably 150°–300° C.;

(ii) heating the composition at a temperature of 100°–200° C., preferably 110°–150° C. (hardening step), and then heating the resulting resin obtained in the hardening step at a temperature which is in the range of 150°–350° C., preferably 180°–300° C. and which is preferably higher than that in the hardening step (after-hardening step); and (iii) gradually heating the composition while continuously increasing the temperature to 150°–350° C.

Of these methods, the method (ii) is the most advantageous from the standpoint of the quality of the hardened product and easiness in the heat treatment. Especially, when pitch or coal tar is used as the raw material, it takes a considerably long time to completely harden the composition at a temperature of 100°–200° C. In such a case, it is advantageous to maintain the composition at a temperature of 100°–200° C. until an infusible resin is obtained, and then after-hardening the infusible resin at a temperature of 150°–350° C. for a short period of time.

The COPNA resin obtained from the thermosetting composition or its intermediate condensation product is characterized by its easiness for preparation and by its excellent heat resistance. A thermograviometric measurement of the COPNA resin at a heat-up rate of 10° C./min in the atmosphere of air or inert gas has revealed that the reduction in weight was below 2% in the temperature range of up to 400° C. The weight reduction occurred in a fair degree between 450°–600° C. when heated in an inert gas atmosphere but was 60–25% when heated to 800° C. The weight reduction is small in the case of using pitch having a high average molecular weight as a raw material. When maintained in air for 700 hours at 250° C., the weight reduction was about 10%. All the above characteristics of the COPNA resin are comparable to a polyimide resin. In addition, COPNA resin may be fabricated using an inexpensive raw material by an easy method. Thus, the COPNA resin can be utilized in many fields.

The COPNA resin is electrically insulating. This property is not lost even when the resin is heated to 450° C. At temperatures above 600° C., the specific resistivity of the COPNA resin is gradually decreased with the increase in temperature.

A COPNA resin film may be obtained by a method including coating an intermediate condensation product which is a precursor of the COPNA resin over the surface of a suitable substrate such as an aluminum foil, drying the resulting coating while preventing the occurrence of hardening, separating the dried coating from the substrate, and heating the resulting separated coating to effect the hardening. When the dried coating of the intermediate condensation product is heated without being separated from the substrate, there is obtained a compsite article having a layer of the COPNA resin tightly bonded over the surface of the substrate. Thus, the intermediate condensation product obtained from the thermosetting composition may be used as a baking finish of a high heat resistance.

By pouring a melt of the intermediate condensation product into a cavity of a mold formed of, for example, a silicone rubber, followed by heating, or by compression molding such as hot pressing of the intermediate condensation product in the form of powder, a molded product formed of the COPNA resin may be obtained.

The intermediate condensation product may also be used as a binder for an aggregate or filler such as a carbon fiber and a glass fiber. A composite material formed of a glass fiber and the COPNA resin may lend itself to many utilization as a cheap, highly heat-resisting insulating material. A composite material formed of a carbon fiber and the COPNA resin has an improved heat-resistance and may be used as a precursor material for carbon fiber/carbon composite materials as expected from its high carbon yield. Other aggregates such as powder, granules, flakes and fibers of ceramics, carbonaceous materials and organic substances may also be used in conjunction with the binder of the intermediate condensation product for the production of hardened, shaped bodies having a high strength. The shaped bodies formed of the aggregate and the COPNA resin may be used as a precursor for a shaped carbon article. Irrespective of whether or not an aggregate is used, the precursor carbon material obtained with the use of the COPNA resin has an advantageous feature in that the structure of the precursor carbon material may be controlled at will by changing the molar ratio of the crosslinking agent to the raw material contained in the thermosetting composition.

The following examples will further illustrate the present invention.

EXAMPLE 1

A thermosetting composition containing pyrene, phenanthrene, p-xylylene glycol (PXG) and p-toluenesulfonic acid (PTS) in the amounts shown in Table 1 was mixed well in a mortar and the mixture was transferred into three test tubes. The contents in the test tubes were then heated and maintained at 120° C., 140° C. and 160° C., respectively, in an oil bath in a nitrogen stream.

TABLE 1

| Pyrene | 5.656 g | (0.028 mole) |
|---|---|---|
| Phenanthrene | 2.136 g | (0.12 mole) |
| PXG | 6.900 g | (0.05 mole) |
| PTS | 0.735 g | (5 wt %) |
| PXG/Aromatics* Molar Ratio | 1.25 | |

*Aromatics: pyrene and anthracene

Figure 3:
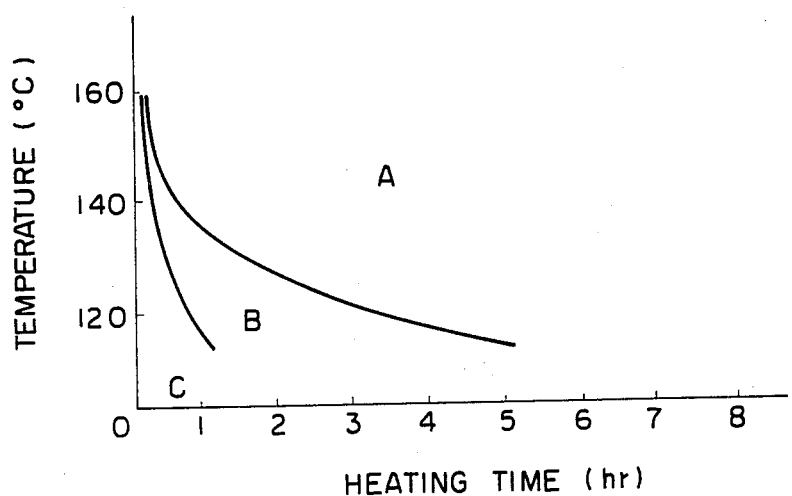
FIG. 3 is a graphic representation showing the relationship between the heating time and temperature in respect of the hardened state of crosslinked products obtained in Example 1.

The hardened state of the reaction product in each test tube is illustrated in FIG. 3 in relation with the heating conditions. In FIG. 3, "A" represents a region in which the product no longer shows fluidity and is a solid at the reaction temperature, "B" represents a region in which the product has a fluidity at the reaction temperature but is a solid at room temperture, and "C" represents a region in which the product is a paste at room temperature.

The hardened products obtained by heating at 140° C. for 4 hours and 160° C. for 4 hours were infusible and insoluble solids which were dark green in color.

Figure 4:
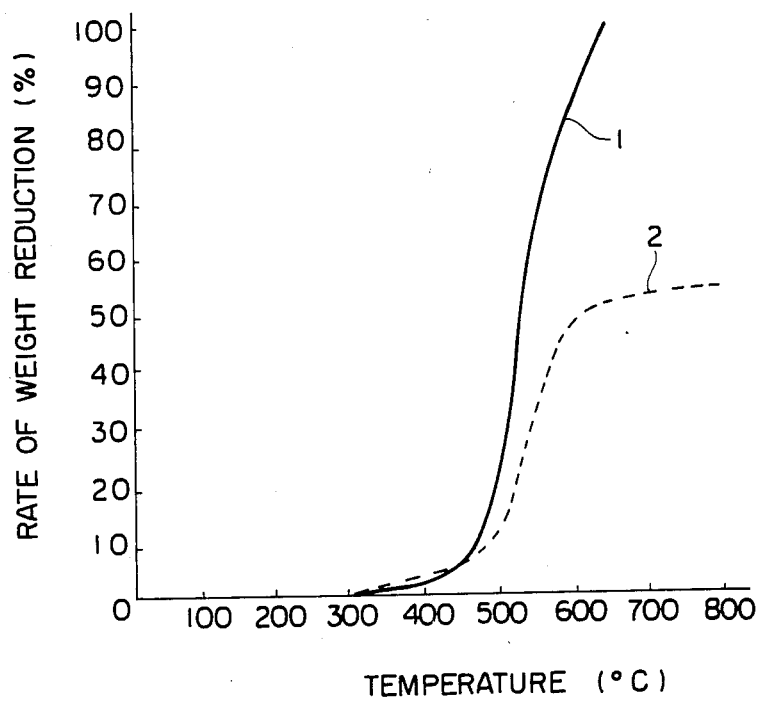
FIG. 4 is a graph showing the rate of the reduction in weight of the COPNA resin obtained in Example 1, when heated in air (curve 1) and in a nitrogen atmosphere (curve 2)

The product obtained by heating at 120° C. for 4 hours was formed of an upper, infusible and insoluble solids layer which was yellow green in color and a lower, yellow, dense solids layer which was slightly softened when heated. The lower layer had an H/C atomic ratio of about 0.75 and was not at all soluble in methanol and n-hexane. The lower layer contained a small quantity of components soluble in tetrahydrofuran, pyridine and quinoline and was swelled in benzene. When further heated at 120° C. for 20 hours, the lower layer became completely infusible and insoluble solids, like the upper layer. The yield of the hardened product obtained by heating at 120° C. for 4 hours was about 91% which was higher than the theoretical yield (87.8%). The reason for this is perhaps because the crosslinking was not perfectly completed and because water produced by the crosslinking was not completely removed from the product. When the hardened product was heated at 200° C. to effect an after-hardening treatment, there was obtained a black solid substance having the same shape as that before the after-hardening with a yield of about 87%. The black substance was found to be electrically insulating. The results of a thermograviometric analysis conducted with a heat-up rate of 10° C./min for the black substance were as shown in FIG. 4. As seen from FIG. 4, the weight reduction was very small at a temperature below about 400° C. when heated in air (curve 1) and in the nitrogen atmosphere (curve 2). When the black product was heated at 250° C. for 500 hours, the weight reduction was 6.5%. When heated at 250° C. for 700 hours, the weight reduction was about 10%.

EXAMPLE 2

Figure 5:
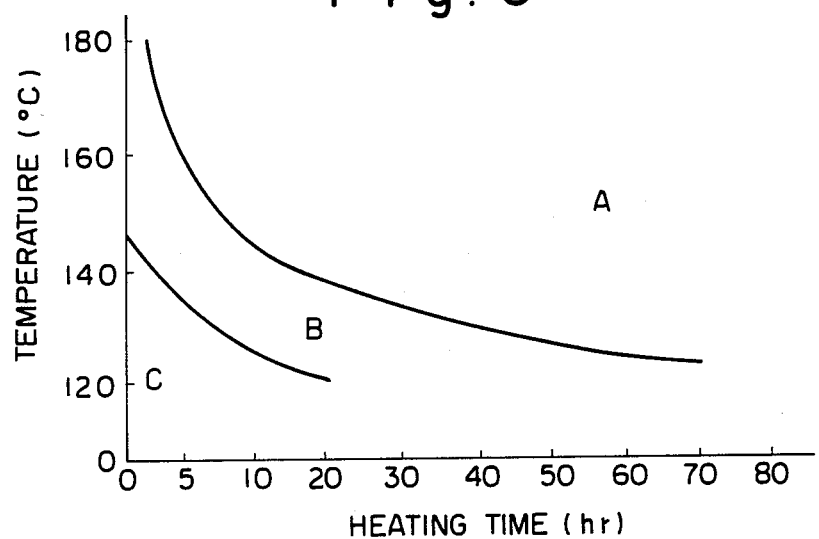
FIG. 5 is a graph, similar to FIG. 3, for crosslinked products obtained in Example 2.

Coal tar pitch (15 g) having a softening point of 64° C., an average molecular weight of 300, an $f_a$ value of 0.95 and an $H_a$ value of 83.1% was mixed with 8.63 g of PXG and 1.18 g of PTS to obtain a thermosetting composition having a PXG/pitch molar ratio of about 1.25. The composition was divided into four equal portions, which in turn were heated at 120° C., 140° C., 160° C. and 180° C., respectively, in air. The states of the hardened products were as illustrated in FIG. 5 in which the letters A, B and C represent the same regions as in FIG. 3.

Figure 6:
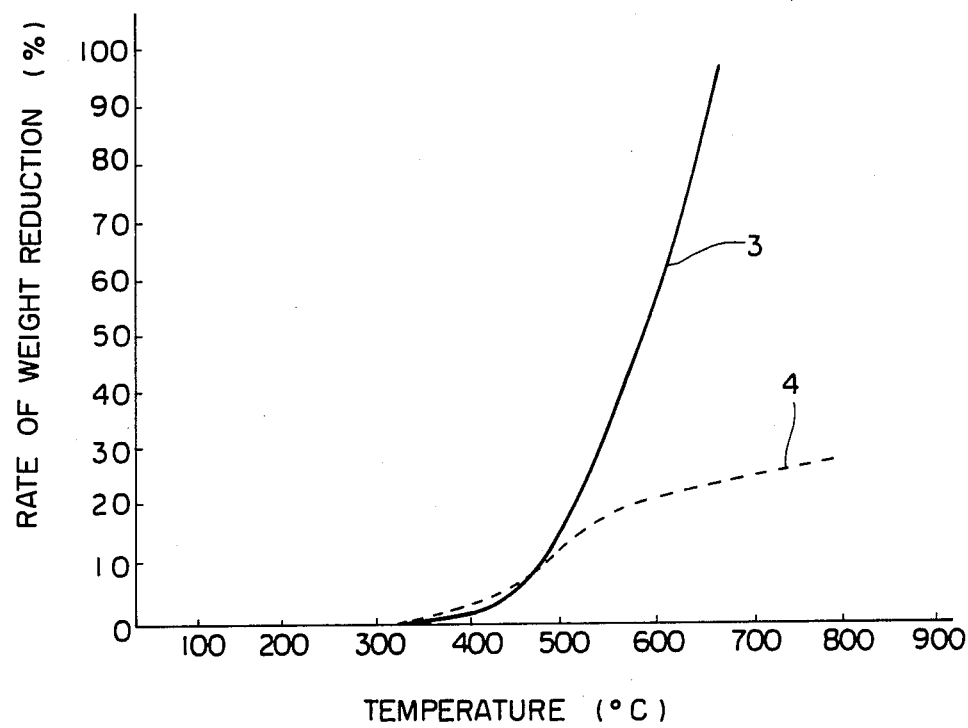
FIG. 6 is a graph, similar to FIG. 4, for the crosslinked products obtained in Example 2.

The products obtained by the crosslinking at 160° C. and 180° C. were porous. The crosslinking at 120° C. required a long time to obtain a hardened product. The product obtained by crosslinking at 140° C. for 65 hours (yield: 94%) was a dense solid which was infusible. The dense solid contained components soluble in tetrahydrofuran and pyridine in such an amount as to color the solvent. The dense solid also contained components which sublimed at 200°-300° C. to give a yellow sublimated substance. By heating the dense solid at 300° C. in air, there was obtained, with a yield of 87.4%, an infusible and insoluble hardened product containing no sublimating substances and having a high strength. The thermograviometric analysis was conducted in the same manner as described in Example 1 to obtain the results shown in FIG. 6. The curves 3 and 4 show the results of heating in air and in an inert atmosphere, respectively.

EXAMPLE 3

A mixture of 90 percent by mole of coal tar pitch having a softening point of 169° C. and an average molecular weight of 600 and 10 percent by mole of phenanthrene was used as a raw material, the average molecular weight of which was about 558. Using the raw material, three kinds of thermosetting compositions I–III were prepared. The compositions I–III contained 50, 35 and 20% of PXG based on the weight of the raw material and 5% of PTS based on the total weight of the raw material and PXG. The molar ratios of PXG to the raw material of the compositions I–III were 2.0, 1.4 and 0.8, respectively.

The thermosetting compositions I–III were heated at 140° C. in air. The composition II gave a hardened product after about 10 hours heating, whereas about 30 hours were required in the case of the composition I. The hardening time in the case of the composition III was shorter than composition I but longer than the composition II. The hardened products obtained from the composition I was heterogeneous. Although the hardened product from the composition III was homogeneous, the strength was not high.

EXAMPLE 4

Using a mixture of pyrene and phenanthrene with the same mixing ratio as in Example 1 (average molecular weight: 195), the coal tar pitch as used in Example 2 (average molecular weight: 300) and the mixture of phenanthrene and pitch as used in Example 3 (average molecular weight: 558) as a raw material and PTS as a catalyst, numerous thermosetting compositions having various PXG to raw material molar ratios of 0.5, 0.75, 1.0, 1.25 and 2.0 were prepared and subjected to crosslinking at various temperatures. As a result, it was revealed that a molar ratio of below 0.5 was insufficient to obtain hardened products and that a molar ratio of above 2.0 tends to lower the hardening rate and to give heterogeneous products. As long as the above raw materials are concerned, a PXG to raw material molar ratio in the range of 0.6–2.0 is suitable for obtaining desirable hardened products.

The above conditions are shown by way of a graph in FIG. 7 in terms of the relation between the amount of PXG and the molecular weight or average molecular weight of the raw material. In FIG. 7, the region P between the two curves roughly represents a range very suitable for obtaining a hardened product. In the region Q, the crosslinking rate becomes low and the product becomes heterogenous. In the region R, the crosslinking rate becomes low and the product becomes low in strength.

EXAMPLE 5

The thermosetting composition prepared in Example 1 was heated at 120° C. for 50 min to obtain an intermediate condensation product (B-stage resin). The product was finely ground and the ground particulate was evenly applied over the surface of carbon fiber paper. After superimposing another carbon fiber paper over the layer of the fine particulate B-stage resin, the laminate was pressed at 80 kg/cm² for 100 min while intermittently increasing the temperature to 110° C., 130° C. and 160° C., followed by after-hardening at 200° C. for 60 min, thereby obtaining a composite sheet. Flexural strength, elastic modulus and shearing strength of the composite sheet were measured before and after maintaining the sheet at 250° C. in air for 10 hours, revealing that the change in the physical properties was within 3%.

EXAMPLE 6

Coal pitch (average molecular weight: 300, softening point: 49° C.) was mixed with p-xylylene dichloride to give a mixture having a molar ratio of the dichloride to the pitch of 0.5, to which was further admixed anhydrous aluminum chloride in an amount of 5% based on the weight of the above mixure. The resulting composition was heated at 140° C. for 30 min to obtain an intermediate condensation product (B-stage resin). When heated to 200° C., the B-stage resin becomes in the form of a paste. The paste was then charged in a mold cavity with a size of 20×50×100 mm and heat-molded therein, followed by after-hardening at 200° C. for 20 hours. The thus obtained molded product was subjected to a thermograviometric analysis with a heat-up rate of 20° C./min. No reduction of weight was observed when heated to 420° C.

We claim:

1. A thermosetting composition consisting essentially of:
   (i) a raw material containing one or more condensed polynuclear aromatic compounds having at least three condensed benzene rings, said raw material being selected from the group consisting of phenanthrene, anthracene, pyrene, chrysene, naphthacene, fluoranthene, perylene, picene, benzpyrenes, benzperylenes, and alkyl derivatives and mixtures thereof, and pitches having a softening point of 100°–200° C., an $f_a$ value of at least 0.6 and an $H_a$ value of at least 20%;
   (ii) a crosslinking agent containing an aromatic compound having at least two hydroxymethyl or halomethyl groups; and
   (iii) an acid catalyst;
   wherein the amounts of said raw material and said crosslinking agent are such as to satisfy the following condition:

$$\frac{1.1}{n} \leq \frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslinking agent and n is the number of the hydroxymethyl or halomethyl groups of said crosslinking agent.

2. A thermosetting composition according to claim 1, wherein said raw material is at least one compound selected from the group consisting of phenanthrene, anthracene, pyrene, chrysene, naphthacene, fluoranthene, perylene, picene, benzpyrenes, benzperylenes and alkyl derivatives thereof.

3. A thermosetting composition according to claim 2, wherein said raw material is a mixture of pyrene and phenanthrene.

4. A thermosetting composition according to claim 1, wherein said raw material is a pitch having a softening point of 10°–200° C., an $f_a$ value of at least 0.6 and an $H_a$ value of at least 20%.

5. A thermosetting composition according to claim 4, wherein said pitch is a coal-derived or petroleum-derived pitch.

6. A thermosetting composition according to claim 1, wherein said crosslinking agent is a member selected from the group consisting of di(hydroxymethyl)benzenes, di(hydroxymethyl)-naphthalenes, tri(hydroxymethyl) benzenes, tri(hydroxymethyl)-naphthalenes, di(halomethyl)benzenes, di(halomethyl)naphthalenes, tri(halomethyl)benzenes, tri(halomethyl)naphthalenes and alkyl derivatives thereof.

7. A thermosetting composition according to claim 6, wherein said crosslinking agent is p-di(hydroxymethyl)-benzene or a dimethyldi (hydroxymethyl)benzene.

8. A thermosetting resin composition consisting essentially of a fusible product obtained by a method including the steps of:
providing a mixture which comprises
(i) a raw material containing one or more condensed polynuclear aromatic compounds having at least three condensed benzene rings, said raw material being selected from the group consisting of phenanthrene, anthracene, pyrene, chrysene, naphthacene, fluoranthene, perylene, picene, benzpyrenes, benzperylenes, and alkyl derivatives and mixtures thereof, and pitches having a softening point of 100°–200° C., an $f_a$ value of at least 0.6 and an $H_a$ value of at least 20%;
(ii) a crosslinking agent containing an aromatic compound having at least two hydroxymethyl or halomethyl groups; and
(iii) an acid catalyst;
wherein the amounts of said raw material and said crosslinking agent are such as to satisfy the following condition:

$$\frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslinking agent and n is the number of the hydroxymethyl or halomethyl groups of said crosslinking agent, and reacting said mixture at a temperature sufficient to effect the crosslinking of said one or more condensed polynuclear aromatic compounds, thereby to obtain said fusible product.

9. A thermosetting resin composition according to claim 8, wherein said raw material is at least one compound selected from the group consisting of phenanthrene, anthracene, pyrene, chrysene, naphthacene, fluoranthene, perylene, picene, benzpyrenes, benzperylenes and alkyl derivatives thereof.

10. A thermosetting resin composition according to claim 9, wherein said raw material is a mixture of pyrene and phenanthrene.

11. A thermosetting resin composition according to claim 8, wherein said raw material is a pitch having a softening point of 10°–200° C., an $f_a$ value of at least 0.6 and an $H_a$ value of at least 20%.

12. A thermosetting resin composition according to claim 11, wherein said pitch is a coal-derived or petroleum-derived pitch.

13. A thermosetting resin composition according to claim 8, wherein said crosslinking agent is a member selected from the group consisting of di(hydroxymethyl)benzenes, di(hydroxymethyl)-naphthalenes, tri(hydroxymethyl)benzenes, tri(hydroxymethyl)-naphthalenes, di(halomethyl)benzenes, di(halomethyl)naphthalenes, tri(halomethyl)benzenes, tri(halomethyl)naphthalenes and alkyl derivatives thereof.

14. A thermosetting resin composition according to claim 13, wherein said crosslinking agent is p-di(hydroxymethyl)benzene or a dimethyldi (hydroxymethyl)benzene.

15. A method of producing a thermosetting resin, consisting essentially of the steps of:
providing a mixture which includes
(i) a raw material containing one or more condensed polynuclear aromatic compounds having at least three condensed benzene rings, said raw material being selected from the group consisting of phenanthrene, anthracene, pyrene, chrysene, naphthacene, fluoranthene, perylene, picene, benzpyrenes, benzperylenes, and alkyl derivatives and mixtures thereof, and pitches having a softening point of 100°–200° C., an $f_a$ value of at least 0.6 and an $H_a$ value of at least 20%;
(ii) a crosslinking agent containing an aromatic compound having at least two hydroxymethyl or halomethyl groups; and
(iii) an acid catalyst;
wherein the amounts of said raw material and said crosslinking agent are such as to satisfy the following condition:

$$\frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslinking agent and n is the number of the hydroxymethyl or halomethyl groups of said crosslinking agent, and
reacting said mixture at a temperature sufficient to effect the crosslinking of said one or more condensed polynuclear aromatic compounds and to obtain said thermosetting resin as a fusible product.

16. A method according to claim 15, wherein said raw material is at least one compound selected from the group consisting of phenanthrene, anthracene, pyrene, chrysene, naphthacene, fluoranthene, perylene, picene, benzpyrenes, benzperylenes and alkyl derivatives thereof.

17. A method according to claim 15, wherein said raw material is a mixture of pyrene and phenanthrene.

18. A method according to claim 15, wherein said raw material is a pitch having a softening point of 10°–200° C., an $f_a$ value of at least 0.6 and an $H_a$ value of at least 20%.

19. A method according to claim 15, wherein said crosslinking agent is a member selected from the group consisting of di(hydroxymethyl)benzenes, di(hydroxymethyl)naphthalenes, tri(hydroxymethyl)benzenes, tri(hydroxymethyl)naphthanes, di(halomethyl)benzenes, di(halomethyl)naphthalenes, tri(halomethyl)benzenes, tri(halomethyl)naphthalanes and alkyl derivatives thereof.

20. A method according to claim 19, wherein said crosslinking agent is p-di(hydroxymethyl)benzene or a dimethyl-di(hydroxymethyl)benzene.

21. A method according to claim 18, wherein said pitch is a coal-derived or petroleum-derived pitch.

22. A method according to claim 15, wherein $(W_2/W_1) \times (a/b)$ is not smaller than $1.1/n$ (where $W_1$, $W_2$, a, b and n have the same meaning as above) and wherein said reaction of said mixture is stopped before completion of the reaction, whereby said thermosetting resin is hardened and becomes infusible upon a further heat treatment.

23. A method according to claim 15, wherein $(W_2/W_1) \times (a/b)$ is smaller than $1.0/n$ (where $W_1$, $W_2$, a, b and n have the same meaning as above) so that the amount of said crosslinking agent is insufficient to completely harden said mixture, said thermosetting resin capable of being completely hardened when heated together with an additional amount of said crosslinking agent.

24. A method according to claim 15, wherein the amount of said catalyst contained in said mixture is insufficient to completely effect the crosslinking, said thermosetting resin being capable of being completely hardened and becoming infusible when heated with an additional amount of said catalyst.

25. A method according to claim 15, wherein said reaction of said mixture is performed at a temperature of 70°–300° C.

26. A process for the production of a heat-resisting, condensed polynuclear aromatic hydrocarbon resin, consisting essentially of the steps of:
providing a mixture containing:
(i) a raw material containing one or more condensed polynuclear aromatic compounds having at least three condensed benzene rings, said raw material being selected from the group consisting of phenanthrene, anthracene, pyrene, chrysene, naphthacene, fluoranthene, perylene, picene, benzpyrenes, benzperylenes, and alkyl derivatives and mixtures thereof, and pitches having a softening point of 100°–200° C., an $f_a$ value of at least 0.6 and an $H_a$ value of at least 20%;
(ii) a crosslinking agent containing an aromatic compound having at least two hydroxymethyl or halomethyl groups; and
(iii) an acid catalyst;
wherein the amounts of said raw material and said crosslinking agent are such as to satisfy the following condition:

$$\frac{1.1}{n} \leq \frac{W_2}{W_1} \times \frac{a}{b} \leq \frac{6}{n}$$

where $W_1$ represents the weight of said raw material, $W_2$ represents the weight of said crosslinking agent, a represents the molecular weight or average molecular weight of said raw material, b represents the molecular weight or average molecular weight of said crosslinking agent and n is the number of the hydroxymethyl or halomethyl groups of said crosslinking agent, and
reacting said mixture to form said heat-resisting, condensed polynuclear aromatic hydrocarbon resin as an infusible product.

27. A process according to claim 26, wherein said reaction is conducted so that said infusible product is substantially insoluble in organic solvents.

28. A process according to claim 26, wherein said reaction is performed at a temperature of 70°–350° C.

29. A process according to claim 28, wherein said reaction step includes the substeps of:
(i) heating said mixture at a temperature of 70°–300° C. to obtain a fusible intermediate condensation product which is insoluble in n-hexane but is soluble in quinoline;
(ii) heating said intermediate condensation product at a temperature of 100°–200° C. to obtain an infusible resin containing only a small amount of components soluble in quinoline; and
(iii) heating said infusible resin at a temperature of 150°–350° C. to obtain said heat-resisting, condensed polynuclear aromatic hydrocarbon resin as an infusible product which is insoluble in quinoline.

30. A process according to claim 29, wherein said sub-step (ii) is conducted while contacting said intermediate condensation product with an aggregate material.

31. A process for the production of a heat-resisting, condensed polynuclear aromatic hydrocarbon resin, consisting essentially of the steps of:
providing a mixture containing
(i) a raw material containing one or more condensed polynuclear aromatic compounds having at least three condensed benzene rings, said raw material being selected from the group consisting of phenanthrene, anthracene, pyrene, chrysene, naphthacene, fluoranthene, perylene, picene, benzpyrenes, benzperylenes, and alkyl derivatives and mixtures thereof, and pitches having a softening point of 100°–200° C., an $f_a$ value of at least 0.6 and an $H_a$ value of at least 20%;
(ii) a crosslinking agent selected from the group consisting of aromatic compounds having two hydroxymethyl groups and aromatic compounds having two halomethyl groups and
(iii) an acid catalyst, wherein the amounts of said raw material and said crosslinking agent are such as to satisfy the following condition:

$$0.5 \geq \frac{W_2'}{W_1} \times \frac{a}{b}$$

where $W_1$ represents the weight of said raw material, $W_2'$ represents the weight of said crosslinking agent, a represents the molecular weight or average weight of said raw material and b represents the molecular weight of said crosslinking agent;
reacting said mixture at a temperature of 70°–300° C. to obtain a fusible product;
admixing said fusible product with the crosslinking agent in an amount satisfying the following condition:

$$0.55 \leq \frac{W_2' + W_2''}{W_1} \times \frac{a}{b} \leq 3.0$$

where $W_1$, $W_2'$, a and b have the same meaning as above and $W_2''$ represents the amount of said crosslinking agent additionally added to said fusible product; and
reacting said admixture at a temperature of 70°–350° C. to obtain said heat-resisting, condensed polynuclear aromatic hydrocarbon resin as an infusible product.

32. A thermosetting resin composition according to claim 8, further consisting essentially of an aggregate selected from glass fibers, carbon fibers and ceramics.

33. A method according to claim 15, wherein said reaction is performed at a temperature of 70°–300° C.

* * * * *

UNITED STATES PATENT AND TRADEMARK OFFICE
CERTIFICATE OF CORRECTION

PATENT NO. : 4,758,653

DATED : July 19, 1988

INVENTOR(S) : Sugio Otani et al.

It is certified that error appears in the above-identified patent and that said Letters Patent is hereby corrected as shown below:

ON THE FACE OF THE PATENT:

Please delete the name of the "Assignee".

IN THE SPECIFICATION:

Col. 2, line 17, "crosslining" should read --crosslinking--.

Col. 3, lines 26 and 28, "groups-containing" should read --group-containing--.

Col. 6, line 45, "di(hydroxymethy)" should read --di(hydroxymethyl)--.

Col. 10, line 64, "compsite" should read --composite--.

UNITED STATES PATENT AND TRADEMARK OFFICE
CERTIFICATE OF CORRECTION

PATENT NO. : 4,758,653

DATED : July 19, 1988

INVENTOR(S) : Sugio Otani et al.

It is certified that error appears in the above-identified patent and that said Letters Patent is hereby corrected as shown below:

Column 13, line 46, "condenation" should read -- condensation --.

Signed and Sealed this

Sixth Day of December, 1988

Attest:

DONALD J. QUIGG

*Attesting Officer*  *Commissioner of Patents and Trademarks*